Oct. 8, 1957 R. T. TOWNSEND 2,808,866
MEAT CHOPPER HAVING ROTARY AND STATIONARY BLADES
Filed Jan. 31, 1955 3 Sheets-Sheet 1
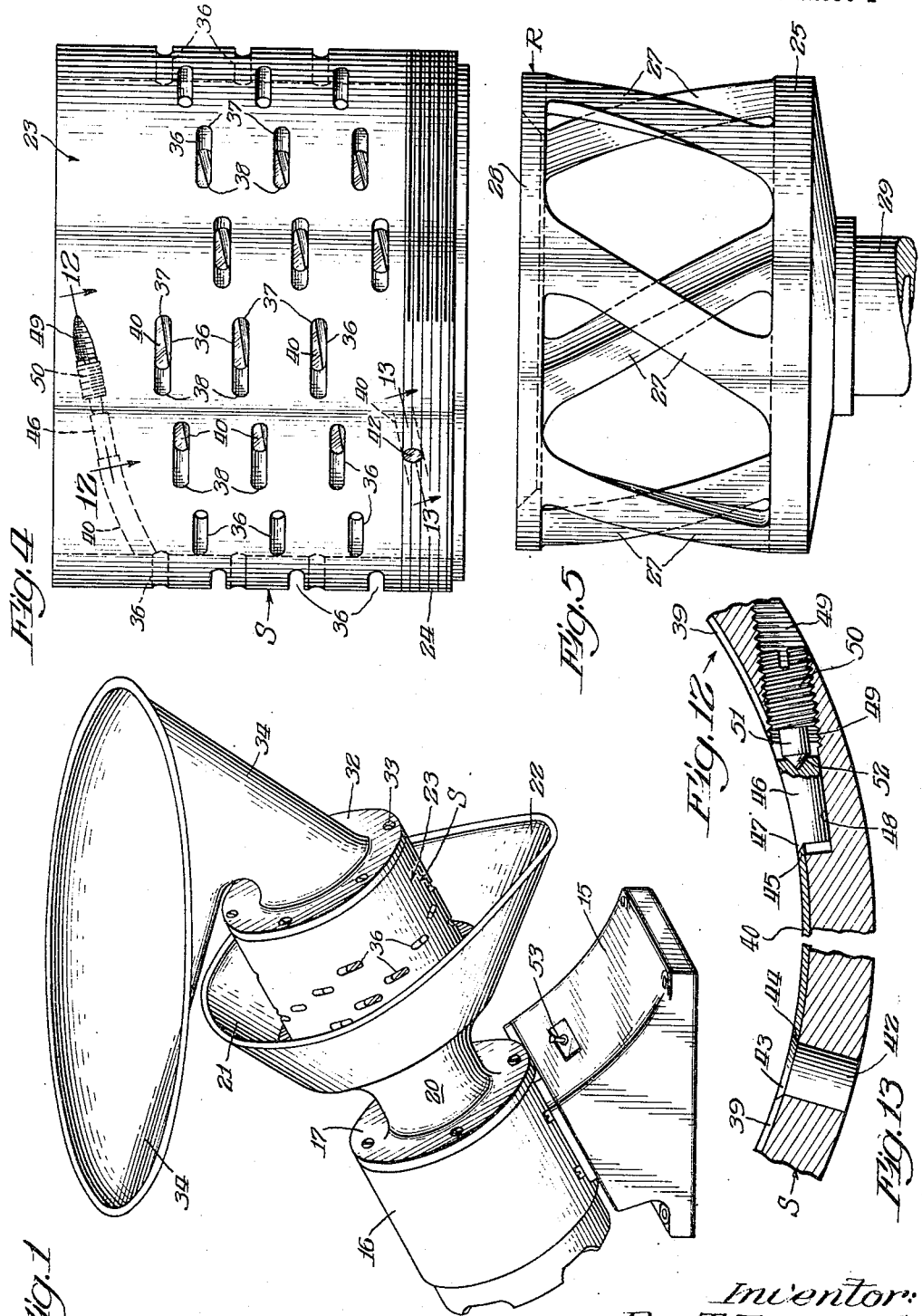
Inventor:
Ray T. Townsend
By Bair, Freeman & Molinare Attys.

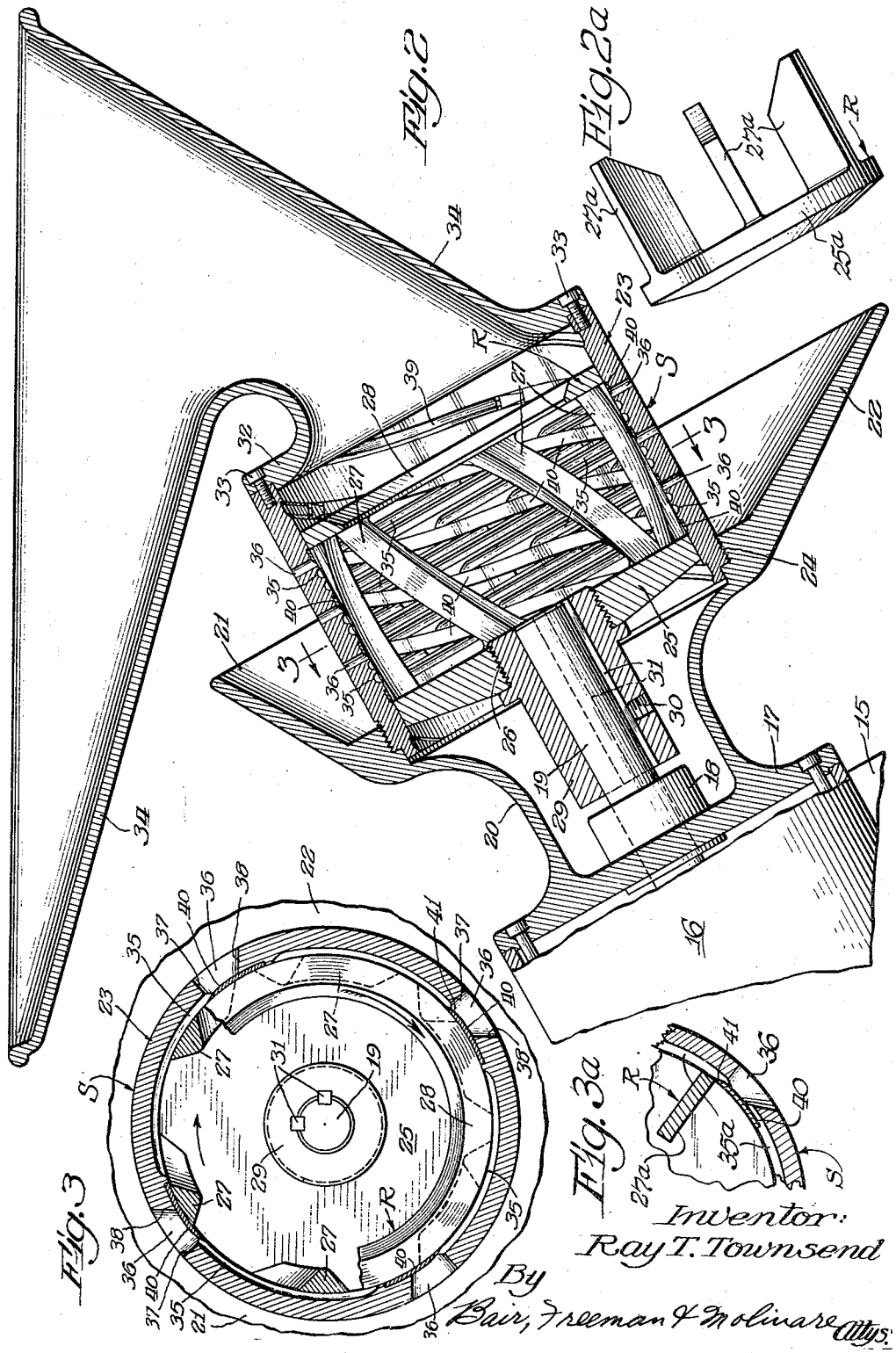

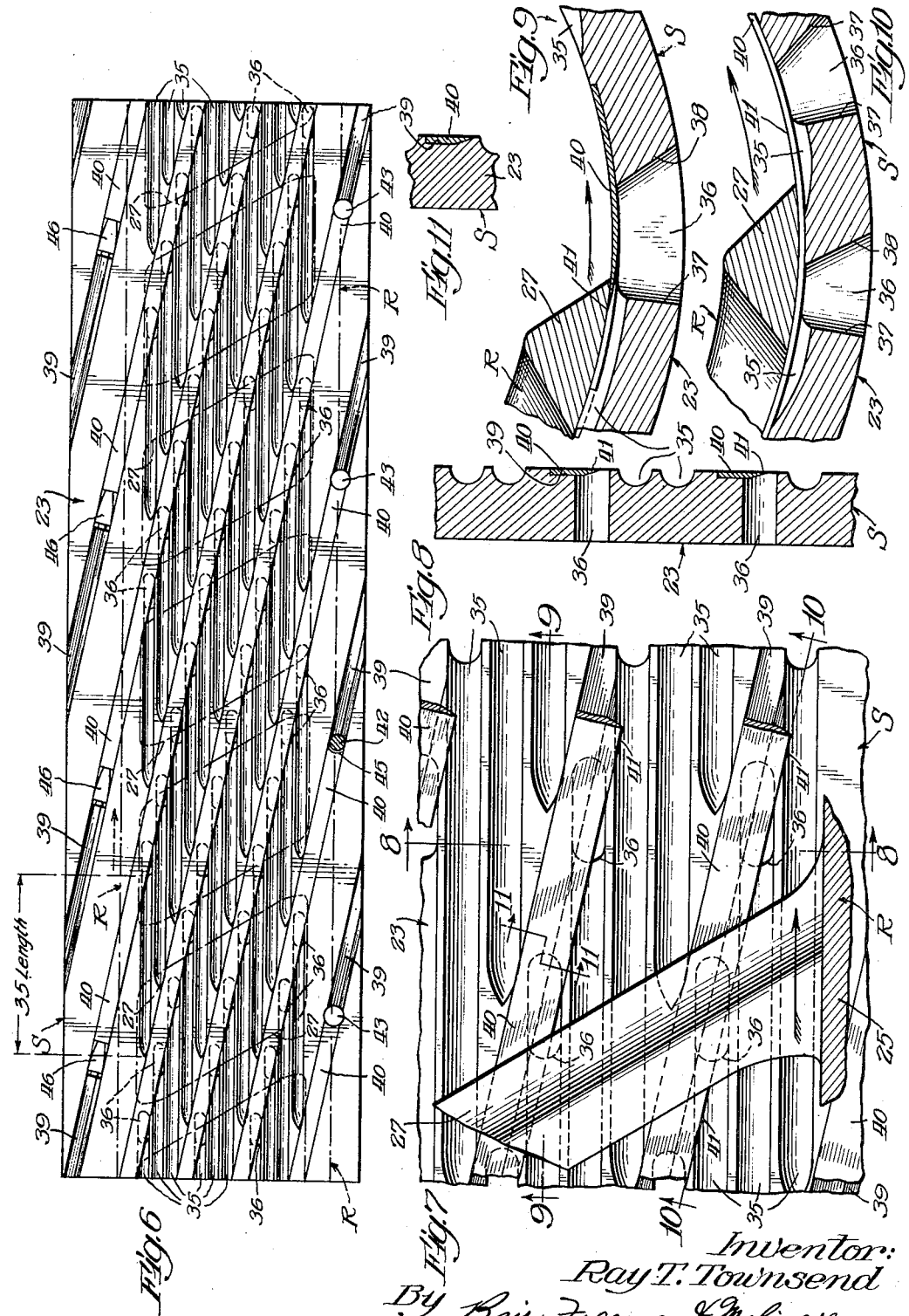

2,808,866
Patented Oct. 8, 1957

2,808,866
MEAT CHOPPER HAVING ROTARY AND STATIONARY BLADES

Ray T. Townsend, Des Moines, Iowa

Application January 31, 1955, Serial No. 485,137

15 Claims. (Cl. 146—124)

This invention relates to a grinder for meat and the like, which is so designed as to have relatively great capacity for its size and for the horsepower expended in operating it.

One object of the invention is to provide a meat grinder of comparatively simple and inexpensive construction having but two operating parts, a stator and a rotor, the rotor being designed to propel the meat rotationally within the stator and impart to it centrifugal force which cooperates in the grinding or cutting of the meat.

Another object is to provide the internal surface of the stator with receiving grooves for the meat interrupted by cutter blades associated with the grooves in such a manner that they cut relatively small pieces from the chunks of meat which are not smeared or their quality otherwise impaired by the action of the grinder.

Still another object is to provide a stator with interrupted meat-receiving grooves, cutter blades and discharge openings for the meat, and a deflector cone and discharge spout around the stator to catch the ground meat which "boils" out of the discharge openings of the stator, the size of the grooves determining the coarseness of the ground meat.

A further object is to provide a grinder which acts on the meat so as to cut discrete particles therefrom in which the cells of the meat are closed as distinguished from being crushed or smeared and disintegrated as in the usual plate types of grinders.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a perspective view of a grinder for meat and the like embodying my present invention;

Figure 2 is an enlarged vertical sectional view thereof showing details of construction;

Figure 2a is a side elevation showing a modified form of rotor;

Figure 3 is a sectional view on the line 3—3 of Figure 2;

Figure 3a is a sectional view similar to a portion of Figure 3 showing a modified form of meat receiving groove;

Figure 4 is a side elevation of the stator which I use in my grinder;

Figure 5 is a side elevation of the rotor thereof;

Figure 6 is a 360° layout view of the internal surface of the stator showing the cutter blades in place and, by dot and dash lines, the position of the propeller blades of the rotor when they are likewise laid out;

Figure 7 is an enlarged view of a portion of Figure 6, showing also one of the propeller blades of the rotor;

Figure 8 is a sectional view on the line 8—8 of Figure 7;

Figures 9 and 10 are sectional views on the lines 9—9 and 10—10, respectively, of Figure 7;

Figure 11 is a sectional view on the line 11—11 of Figure 7; and

Figures 12 and 13 are enlarged sectional views on the lines 12—12 and 13—13 of Figure 4.

On the accompanying drawings, I have used the reference numeral 15 to indicate a base for my grinder and 16 a motor for driving the grinder. The motor 16 may be of any desired type, preferably electric. A switch 53 is shown mounted on the base 15 for controlling energization of the motor 16.

In place of one of the usual end plates on the motor I substitute an end plate 17 of special design having a hub 18 for containing the front bearing of the motor shaft 19. The end plate 17 has a tubular extension 20 terminating in a deflector cone 21, the lower side of which is deformed to provide a discharge spout 22.

The essential elements of my grinder are a stator S and a rotor R. The stator S comprises a cylindrical wall 23 which is suitably mounted in the deflector cone 21 and rigidly supported thereby. For instance, the two may be screwed together at threads indicated 24 in Figure 2.

The rotor R may be in the form of a casting or the like, having a wall 25 at one end and an open ring 28 at the other end. The wall and ring are connected together by a plurality of propeller blades 27. These blades in cross sectional shape may be substantially triangular as shown in Figs. 9 and 10 to prevent meat from collecting on their inner surfaces and may be diagonally arranged in relation to their direction of travel with their inclination opposed to that of the cutter blades 40 to be later described.

The end wall 25 is threaded at 26 on a drive sleeve 29 which is secured to the motor shaft 19 by means of a pair of keys 31 and set screws 30 as shown in Figures 2 and 3.

A cover plate 32 is provided for the cylindrical wall 23 of the stator S and may be secured to the cylindrical wall as by screws 33. The cover plate 32 terminates in a hopper 34 to receive the meat to be ground, as will hereinafter appear.

With respect to the construction of the stator S, the cylindrical wall 23 has receiving grooves 35 for the meat to be ground and these are interrupted, the length of one being indicated at "35 length" adjacent the top left end of Figure 6. As shown in Figures 9 and 10, these grooves terminate in discharge openings 36 having receiving ends 37 and discharge ends 38. The interrupted receiving grooves 35 are in planes normal to the axis of rotation of the rotor R, the direction of rotation being counter-clockwise in Figures 9 and 10 and clockwise in Figure 3, as indicated by arrows in these figures and also in Figure 7.

Helically arranged cutter-blade grooves 39 are provided from end to end of the stator S. The grooves 35 and 39 are shown in layout form on Figure 6, which represents a full 360 degrees of the interior of the stator. A cutter blade 40, having one edge sharpened as at 41 is held in each groove by a stud 42 having a head 43 overlying a beveled end 44 of the blade, as best shown in Figure 13, whereas the opposite end of the blade is beveled at 45 as shown in Figure 12 and held by a plug 46 having a flange 47 overlying the bevel 45. The plug 46 is slidable in a bore 48 and this bore terminates in a threaded bore 49 having a set screw 50 therein, provided with a point 51. The point 51 enters a socket 52 of the plug 46. Tightening of the setscrew 50 tends to expand the diameter of the blade 40 so that it is held tightly seated in the cutter blade groove 39.

As shown in Figure 6, four of the blades 40 are provided, each one spirally encircling the inside of the stator S for about one revolution. They terminate approximately coincident with the end of the rotor R which in Figure 6 is shown by dot and dash lines together with its six propeller blades 27. The internal diameter of the stator S and blades 40 may be between few thousands to 1/16" greater than the external diameter of the rotor R.

In Figure 2a, a modified form of rotor R' is disclosed which I have found suitable wherein the disc 25 and the propeller blades 27 of Fig. 2 are modified to the extent illustrated, the disc being indicated 25a and the blades 27a. The blades 27a, it will be noted, extend parallel to the axis of the disc rather than helically and only three of them are provided, the ring 28 of Figure 2 being omitted. In Figure 3a a cross section of one of the propeller blades 27a is shown.

Also, Figure 3a shows a modified stator wherein the grooves 35a are continuous instead of interrupted, except as they are interrupted by the blades 40 that cross them. I find this arrangement also satisfactory. Even though the groove extends under the blade, the meat that is cut by the blade is effectively discharged through the opening 36.

*Practical operation*

In the operation of my grinder for meat and the like the rotor R is rapidly rotated in the direction already specified and shown by arrows in Figures 3, 7, 9 and 10. For instance, the speed of rotation may be anywhere from 850 to 3400 R. P. M. Chunks of meat or the like may be deposited in the hopper 34 and will enter the rotor R.

Due to the rapid rotation of the rotor the meat will be driven by the propeller blades 27 and thereby rotated so that centrifugal force acts thereon to throw the meat against the inner surface of the stator and force it into the grooves 35. Since these grooves are interrupted by the cutter blades 40, there will be substantially a semi-circular piece of meat in each groove in addition to the rest of the meat bearing against the inner surface of the stator and the semi-circular pieces will be cut from the rest of the chunk as they encounter the sharpened edges 41 of the blades 40 and will pass out through the discharge openings 36.

I have found that by locating the discharge opening 36 with its receiving end 37 adjacent the cutting edge 41 of the blade, the meat will be discharged in short particles and at the same time the meat will not be smeared, which is undesirable in connection with the grinding of meat and particularly when there is any fat present in it.

The length of the receiving groove 35 already referred to is such that it begins just after a cutter blade 40 is passed, and ends under the next cutter blade as perhaps best shown in Figure 7. Accordingly, as soon as meat is cut from the chunk and passes over the blade, another portion thereof enters the next groove 35 for the next knife to cut meat therefrom. This arrangement results in high efficiency as far as the output of the grinder is concerned in terms of pounds of meat. Also the peculiar type of cutting or grinding that occurs in my device makes it possible to provide a machine of a given output that requires only about 10 or 15% of the horse power to operate it when compared with the usual types of meat grinders having a spiral feed screw and a perforated or spoked cutting plate at the end of the feed screw.

Figures 2a and 3a illustrate modifications of my grinder shown in Figures 1 to 13 that operate satisfactorily. These modifications indicate the possibility of change in several design features that are possible and yet and efficient grinder results when these constructions are used. Accordingly, in my claims I wish it to be understood that the grooves may be interrupted either by forming them with interruptions or forming them continuous and interrupting them by crossing them by the blades 40. Also, the claims are not to be construed as limiting the blades of the rotor to a spiral arrangement.

While I have described an embodiment which I find satisfactory, several changes in receiving groove and cutter blade arrangements are possible, utilizing the same principles and it is therefore my purpose to cover by my claims those modified forms of structure or use of mechanical equivalents which may be reasonably included within their scope.

I claim as my invention:

1. In a grinder of the character disclosed, a drum-like stator having grooves on the interior surface thereof for receiving meat, stationary cutter blades crossing the tops of said grooves and having cutting edges substantially coincident with the inner surface of said drum, and a rotor rotatable in said drum and having propeller blades to rotate chunks of meat inside said stator, said stator having discharge passageways opening outwardly from said grooves.

2. In a grinder of the character disclosed, a drum-like stator having grooves on the interior surface thereof for receiving meat, stationary cutter blades crossing the tops of said grooves and having cutting edges along their upstream sides, a rotor rotatable in said drum and having propeller blades to rotate chunks of meat inside said stator, said stator having discharge passageways opening outwardly at the downstream ends of said grooves, and a deflector surrounding said stator to catch the ground meat from said discharge openings.

3. In a grinder of the character disclosed, a drum-like stator having grooves on the interior surface thereof for receiving meat, said stator having cutter blades crossing said grooves at the tops thereof and having cutting edges substantially coincident with the iner surface of said drum, a rotor rotatable in said drum and having propeller blades to rotate chunks of meat inside said stator, said grooves of said stator being substantially aligned with the direction of rotation of said rotor, said stator having discharge openings at the downstream ends of said grooves.

4. In a grinder of the character disclosed, a drum-like stator having grooves on the interior surface thereof for receiving meat, said grooves being substantially aligned with the direction of rotation of said rotor, said stator also having cutter blades crossing the tops of said grooves diagonally and having cutting edges along their upstream sides, a rotor rotatable in said drum and having propeller blades to rotate chunks of meat inside said stator, said stator having discharge openings at the downstream ends of said grooves.

5. In a grinder for meat and the like, a cylindrical stator open at one end, a cylindrical rotor rotatable therein and likewise open at one end, said stator having meat-receiving grooves on its interior surface, stationary cutter blades crossing said grooves in diagonal directions and located at the tops thereof, said grooves being interrupted by said blades, said stator having discharge openings from said grooves and located under said blades, said rotor having propeller blades around its cylindrical surface operable to rotate chunks of meat entering said rotor through the open end thereof and by centrifugal force to cause portions thereof to enter said grooves to be cut by said cuter blades and discharged through said openings.

6. In a grinder for meat and the like, a cylindrical stator open at one end, a cylindrical rotor rotatable therein and likewise open at one end, said stator having meat-receiving grooves on its interior surface, cutter blades crossing the tops of said grooves and stationary relative thereto, said grooves being interrupted by said blades, said stator having discharge openings for said grooves under said blades, said rotor having propeller blades around its cylindrical surface operable to rotate chunks of meat entering said rotor through the open end thereof and by centrifugal force to cause portions thereof to enter said grooves to be cut by said cutter blades and discharged through said openings, and means for collecting the meat discharged through said discharge openings.

7. In a grinder of the character disclosed, a drum-like stator having grooves on the interior surface thereof for receiving meat, stationary cutter blades crossing and thereby interrupting said grooves and having cutting edges at the tops of said grooves and facing in one direction, and a rotor rotatable in the opposite direction in said drum and having propeller blades to rotate chunks of meat inside said stator, said stator having discharge openings from said grooves starting adjacent said cutting edges and terminating under said cutter blades.

8. In a grinder of the character disclosed, a drum-like stator having grooves on the interior surface thereof for receiving meat, cutter blades crossing said grooves at the tops thereof and having cutting edges facing in substantially one direction, and a rotor rotatable in the opposite direction in said drum and having propeller blades to rotate chunks of meat inside said stator, said stator having discharge openings leading from said grooves starting adjacent said cutting edges and terminating under said cutter blades, the terminating edges of said discharge openings being outwardly inclined in the direction of rotation of said rotor.

9. In a grinder for meat and the like, a cylindrical stator open at one end, a drum-like rotor rotatable therein, and open at the same end, said stator having meat-receiving grooves on its interior surface and extending normal to the cylinder axis, cutter blades crossing said grooves, at the tops thereof, said cutter blades being stationary in relation to said grooves, said grooves being interrupted by said blades and said stator having discharge openings from said grooves under said blades, said rotor having propeller blades operable to rotate chunks of meat entering said rotor through the open end thereof, and by centrifugal force to cause portions thereof to enter said grooves to be cut by said cutter blades and discharged through said openings, and means for collecting the meat discharged through said discharge openings.

10. In a grinder of the character disclosed, a drum-like stator having grooves on the interior surface thereof for receiving meat, stationary cutter blades crossing said grooves and having cutting edges at the tops of said grooves, a rotor rotatable in said drum and having propeller blades to rotate chunks of meat inside said stator, said stator having discharge openings from said grooves, said stator having helical grooves to receive said blades, and means tending to contract the lengths of said blades to expand them tightly into said helical grooves.

11. In a grinder of the character disclosed, a drum-like stator having grooves on the interior surface thereof for receiving meat, cutter blades crossing said grooves adjacent the tops thereof, a rotor rotatable in said drum and having propeller blades to rotate chunks of meat inside said stator, said stator having discharge openings from said grooves, said stator having blade grooves crossing said first grooves to receive said blades, and means tending to contract the lengths of said blades to expand them tightly into said grooves.

12. In a grinder of the character disclosed, a drum-like stator having grooves on the interior surface thereof for receiving meat and other grooves crossing said first grooves, cutter blades received in said other grooves and having cutting edges substantially coincident with the inner surface of said drum, a rotor rotatable in said drum and having propeller blades to rotate chunks of meat inside said stator, said stator having discharge openings from said grooves.

13. In a grinder of the character disclosed, a drum-like stator having grooves on the interior surface thereof for receiving meat and other grooves crossing said first grooves, cutter blades mounted in said other grooves and having cutting edges along their upstream sides, a rotor rotatable in said drum and having propeller blades to rotate chunks of meat inside said stator, said stator having discharge openings at the downstream ends of said grooves.

14. In a grinder of the character disclosed, a drum-like stator having grooves on the interior surface thereof for receiving meat, cutter blades crossing the tops of said grooves and having cutting edges substantially coincident with the inner surface of said drum, a rotor rotatable in said drum and having propeller blades to rotate chunks of meat inside said stator, each propeller blade being substantially triangular in cross section and being diagonally arranged in opposition to said cutter blades, said stator having discharge openings from said grooves, and a deflector surrounding said stator to catch the ground meat from said discharge openings.

15. In a grinder of the character disclosed, a drum-like stator having grooves on the interior surface thereof for receiving meat, stationary cutter blades crossing said grooves adjacent the tops thereof and having cutting edges substantially coincident with the inner surface of said drum, a rotor rotatable in said drum and having propeller blades to rotate chunks of meat inside said stator, each propeller blade being diagonally arranged in opposition to said cutter blades, said grooves of said stator being substantially aligned with the direction of rotation of said rotor, and said stator having discharge openings at the downstream ends of said interrupted grooves.

References Cited in the file of this patent

UNITED STATES PATENTS

| | | |
|---|---|---|
| 1,241,702 | Binkley et al. | Oct. 2, 1917 |
| 2,582,244 | Faith-Ell | Jan. 15, 1952 |
| 2,637,359 | Taylor | May 5, 1953 |